United States Patent

[11] 3,604,847

[72] Inventor Kingston E. Ganske
Columbus, Ind.
[21] Appl. No. 705,479
[22] Filed Feb. 14, 1968
[45] Patented Sept. 14, 1971
[73] Assignee Arvin Industries, Inc.
Columbus, Ind.

[54] MULTITRACK MAGNETIC RECORDING SYSTEM
10 Claims, 7 Drawing Figs.

[52] U.S. Cl. .......... 178/6.6 A, 179/100.2 CA, 179/100.2 MD
[51] Int. Cl. .......... G11b 3/36, G11b 21/08, G11b 23/18
[50] Field of Search .......... 179/100.2 MD, 100.2 T, 100.2 CA, 100.2 C, 6.6 I, 6.6 MI; 178/6.6 A

[56] References Cited
UNITED STATES PATENTS

| | | | |
|---|---|---|---|
| 2,915,595 | 12/1959 | Lyons | 179/100.2 |
| 3,419,686 | 12/1968 | Rhoades | 179/100.2 |
| 3,429,578 | 2/1969 | Furuichi | 179/100.2 X |
| 3,470,327 | 9/1969 | Reed | 179/100.2 |
| 2,468,198 | 4/1949 | Heller | 179/100.2 |
| 3,437,762 | 4/1969 | Lear et al. | 179/100.2 |
| 3,452,162 | 6/1969 | Ward | 179/100.2 |

*Primary Examiner*—Bernard Konick
*Assistant Examiner*—Steven B. Pokotilow
*Attorney*—Marechal, Biebel, French & Bugg

ABSTRACT: A magnetic recording head has at least two magnetic transducers constructed in a common head in spaced-apart relation sufficient for convenient assembly and proper shielding of the individual transducers. The transducers follow spaced parallel tracks on the magnetic tape, and are moved after following one set of tracks on the tape into a position for following additional spaced tracks. No two adjacent tracks on the tape contain the same type of recorded information, and all of the tracks are equally spaced apart over the entire range of movement of the head. In color television recording, one transducer records and/or plays back video information and the other transducer records and/or plays back color information and audio. The transducers in the head are spaced apart (on centers) a distance greater than the movement imparted to the head for following different tracks, the movement preferably being two thirds this transducer spacing. This produces alternate tracks on the tape with minimum guard band between any two adjacent tracks, and with each video track on opposite sides of a color-audio track. In longitudinal recording this permits use of a maximum amount of the tape surface, leaving only two possible track areas unused.

INVENTOR
KINGSTON E. GANSKE
BY
Marechal, Biebel, French & Bugg
ATTORNEYS

MULTITRACK MAGNETIC RECORDING SYSTEM

BACKGROUND OF THE INVENTION

This invention relates to a magnetic recording and playback system, and has particular utility in connection with video recording equipment. Such equipment requires the recording and reproduction of television signals which vary over a wide range of frequencies. Particularly in the recording and reproduction of color television signals, the wide variety of signals which must be handled by the recording equipment dictates the manner in which the signals can be handled, and one system for this purpose involves the use of two separate magnetic transducers, independently operating to handle different types of signals, but constructed in such a way that they are maintained in precise alignment. It is important to maintain a precise time base, and time base errors which may be introduced due to misalignment of the two transducers, or particularly to stretching and/or local changes in velocity of the recording tape, simply are not tolerable.

Furthermore, while it is desirable to locate the two transducers as close to each other in the head as feasible, allowances still must be made for ease of construction of the heads and magnetic shielding between the two transducers to eliminate crosstalk. The gap alignment of the two transducers is important, and obviously is more readily maintained when the gaps of the individual transducers are located as close to each other, and with as much rigid interconnection as is possible while still permitting the transducers to perform their individual functions.

Similar requirements exist as to the information recorded on the tape. For example, in one form of equipment according to the invention, one of the transducers in the head records or plays back video signal information, including various signal components, particularly vertical blanking pulses, which are of relatively long duration with respect to portions of the signal. This type of signal when magnetically recorded is more susceptible to crosstalk with information in adjacent recording tracks than higher frequency signals. The other transducer according to this system records and plays back color information and the audio signal, which may be considered another type of signal. These signals can be at relatively higher frequencies and do not have the more critical guard band requirements and crosstalk characteristics of the recorded video signal. Similar recording and playback problems are encountered in other types of magnetic recording equipment where different types of information are handled on spaced parallel tracks through separate spaced transducers.

SUMMARY OF THE INVENTION

According to the present invention at least two magnetic recording and/or playback transducers are constructed on a common base, with the individual transducers spaced apart adequately to permit insertion of their respective cores and windings, together with suitable shielding between them. The transducers are nevertheless constructed as close together as is feasible, and the gap of each transducer is aligned with the other. This promotes recording and playback of the information with essentially no time base difference between the respective tracks.

The head incorporating the multiple transducers is mounted adjacent to a recording media, such as recording tape, which is transported back and forth across the head, thus the individual transducers follow spaced parallel tracks on the tape. The spacing between the two tracks bearing related but different types of information is determined by the physical spacing between the transducers as a result of the head construction. The width of the tracks of the two transducers need not necessarily be the same, although in many embodiments they are the same, however the wider track width controls the appropriate movement of the head with respect to the tape for purposes of causing the transducers to scan different but nonoverlapping tracks along the tape.

The head is moved with respect to the tape through equal increments such that none of the resulting tracks overlap, yet each track followed by one transducer (e.g., the video recording transducer) is always adjacent to a track followed at some time by the other transducer (e.g., the color-audio transducer). Thus, no two adjacent tracks handle the same type of information, rather any two tracks containing the same type of information are separated from each other by a track containing a different type of information which cooperates at some time with the other transducer, and in addition suitable small guard bands or spaces may be provided between adjacent tracks.

With this correlation between head construction including transducer spacing, and incremental movement of the head with respect to the tape, it is possible to utilize substantially the entire recording surface of the tape. For example, only two unused tracks normally will remain on a completely filled tape, one adjacent the initial position of the head and another in the first position of the head. In a typical embodiment, it has been possible to record on magnetic recording tape of ½-inch width, 20 individual tracks, each of approximately 0.017 inch width, with only two such track widths (in other words a total of 0.034 inch) not used in addition to small guard bands between adjacent tracks in the order of 0.001 to 0.003 inch.

The invention is particularly useful in connection with linear recording on magnetic tape, however it should be understood that the principles of the invention are applicable to helical scan recording systems of the general type presently used in television recording equipment.

Accordingly, it is the object of this invention to provide a magnetic recording system embodying the track format and the head and tape space relationships as outlined above, in order to accommodate a maximum of information, particularly where that information varies over a wide range of frequencies, to the characteristics of the tape and recording heads, whereby construction and operation of the equipment is as simple and inexpensive as possible, particularly when the invention is applied to linear recording equipment.

Other objects and advantages of the invention will be apparent from the following description, the accompanying drawings and the appended claims.

DESCRIPTION OF THE PREFERRED EMBODIMENT

Figure 1:
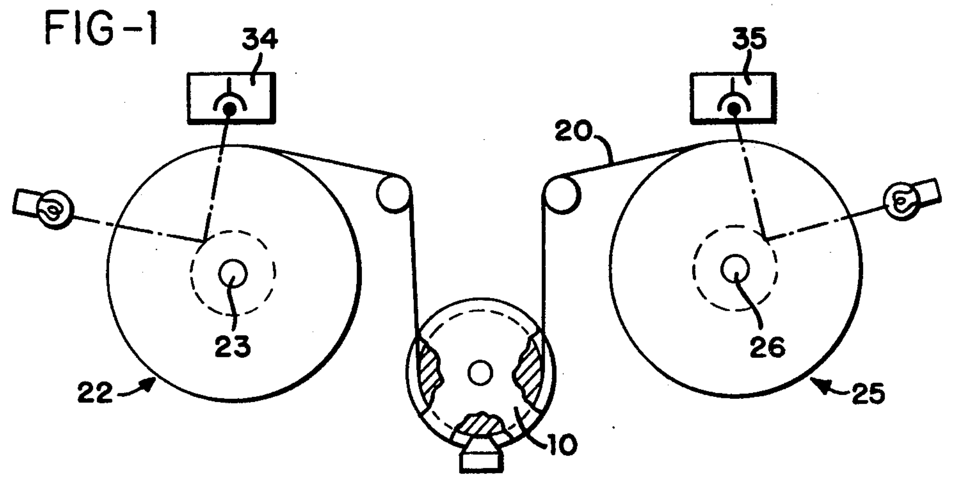
FIG. 1 is a somewhat schematic representation of a typical magnetic tape transporting arrangement to which the present invention applies.
Figures 2, 4:
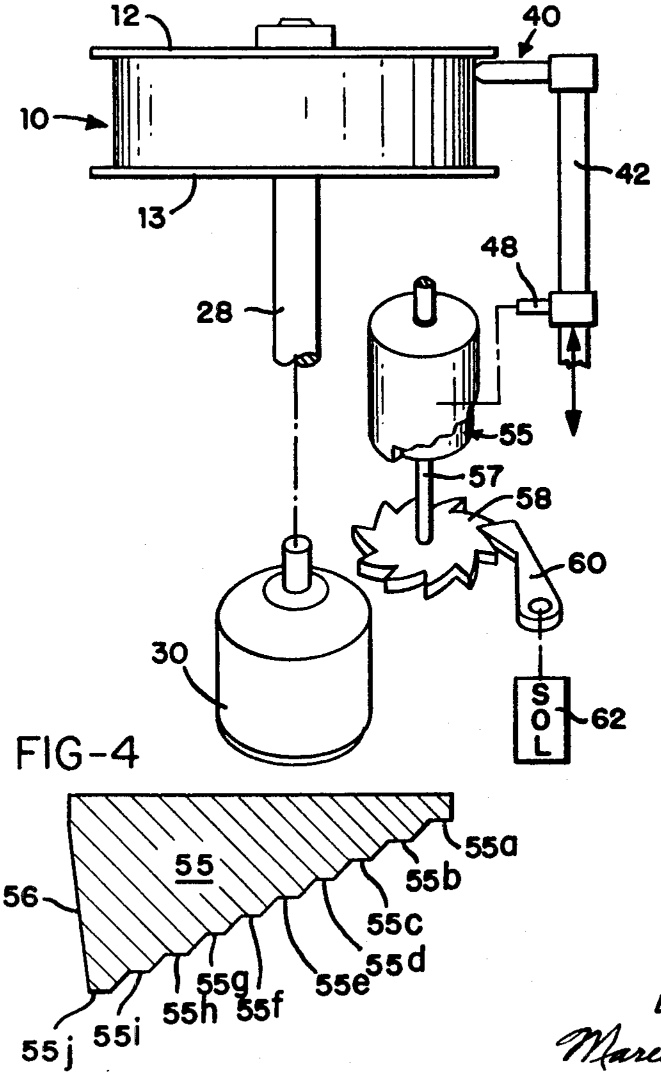
FIG. 2 is a diagrammatic illustration of the apparatus for locating the recording and/or playback head with respect to the recording tape surface.
FIG. 4 is a diagram showing the plan of the circular control cam embodied in the device shown in FIG. 2.

Referring to the drawings, and particularly to FIGS. 1 and 2, the general form of magnetic tape recording system to which the invention pertains includes a transport system having a rotatably mounted capstan 10 with upper and lower guide flanges 12 and 13, respectively, and preferably having a resilient tape engaging surface 15 over which the magnetic recording tape 20 is guided. The tape is shown in FIG. 1 being received from a supply 22 including a hub 23 mounted for rotation and preferably having a retarding drag or brake (not shown) against which the tape is withdrawn from the supply.

The takeup 25 is similar and its hub 26 is rotatably mounted and also has a similar brake which is active when the transport system is run in the opposite direction. Thus the transport system may be bidirectional, and the invention offers certain advantages to such a transport. The capstan shaft 28 is driven by a suitable motor 30, such as a synchronous electric motor, and provides the power for conveying the tape from the supply to the takeup, and back again, in which case this terminology is reversed.

Another suitable form of transport system is disclosed in copending application Ser. No. 705,478, filed concurrently herewith and assigned to the same assignee, entitled TAPE TRANSPORT SYSTEM, now U.S. Pat. No. 3,489,369.

In accordance with a preferred form of the invention the tape is scanned longitudinally in either direction of movement, forward or reverse, hence the supply and takeup are interchangeable in the sense that the tape is transported from one to the other and back. A suitable sensing mechanism 34 such as a photoelectric detector responsive to light from a reflective segment near the end of the tape, at the supply. Actuation of this detector is used to signal the need to reverse the direction of rotation of the capstan. Similarly, a corresponding detector 35 is positioned at the takeup to respond to reflected light from a reflected segment near the other end of the tape, and to signal the need again to reverse direction.

Figure 3:
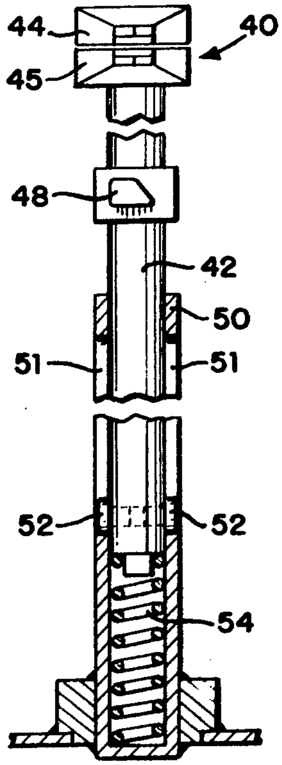
FIG. 3 is a drawing, broken and partially shown in section, illustrating the mounting of the recording and/or playback head for movement with respect to the tape.

Referring particularly to FIGS. 2–4, in accordance with the invention a multiple magnetic transducing means in the form of a head 40 is mounted on a supporting post 42 for movement transversely of the path of movement of the tape 20 which is carried past the head 40 on capstan 10. This head includes a plurality of magnetic recording-playback transducers 44 and 45 which are constructed on a common chassis (as described hereafter) and are adapted to scan multiple tracks along parallel portions of the tape. The track width is a relatively small fraction of the total width of the tape, for example in a typical embodiment the tape 20 has a width of one-half inch, and each track width is 0.017 inch (although the track widths need not be equal). Thus, the tracks followed by the head occupy relatively small and spaced apart segments of the width of the tape, and the head 40 can be moved as a whole to different positions with respect to the tape in order to scan different pairs of tracks as the tape is transported in one direction or the other between the supply and takeup.

In accordance with the invention the individual recording-playback transducers are spaced apart for purposes of shielding and for ease in construction, by an amount which is correlated to the movement of the head in scanning different tracks. Details of this relationship are shown particularly in FIGS. 5 and 6, and are explained in detail hereafter. For purposes of moving the heads simultaneously, the supporting rod or post 42 is provided with a cam follower 48, and the post is mounted for vertical movement, for example a tubular holder 50 having guiding slots 51 in its walls for receiving a guiding crosspin 52 that projects through the post 42 and maintains the desired position of the heads transverse to the tape during the vertical movement. The supporting tube 50 is suitably mounted on the base and preferably includes a light spring 54 adapted to press upward against the post 42 urging it against the upper limit position.

The cam follower 48 engages a barrel type cam 55 which is mounted adjacent the post 42, being secured to a rotatable shaft 57 which has fixed to it a ratchet wheel 58. The pawl 60, which may be controlled for example by a solenoid 62, is arranged to rotate the ratchet wheel and hence the cam 55, by a predetermined angular amount. Preferably, a conventional secondary pawl (not shown) is provided to hold the ratchet wheel in any given position.

FIG. 4 is a graphic view of the control surface of cam 55, illustrating 10 steps *55a–55j*, any one of which may be engaged with the follower 48 to locate the post and the heads in a corresponding vertical position. As will be obvious from FIG. 2, counterclockwise of cam 55, as viewed from above, will provide a cam action on the follower 48 tending to push it downward in a step-by-step fashion. After the final or lowermost step, there is a return and a ramp 56 which will guide the follower back to its uppermost position *55a* in response to urging of the spring 54.

Figure 5:
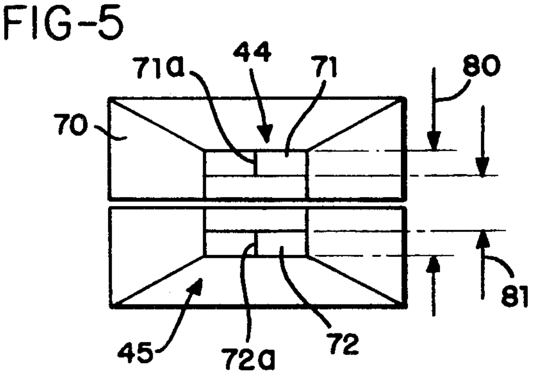
FIG. 5 is an enlarged frontal view of the recording head illustrating the relationship and spacing of the individual transducers and their respective gaps.
Figure 6:
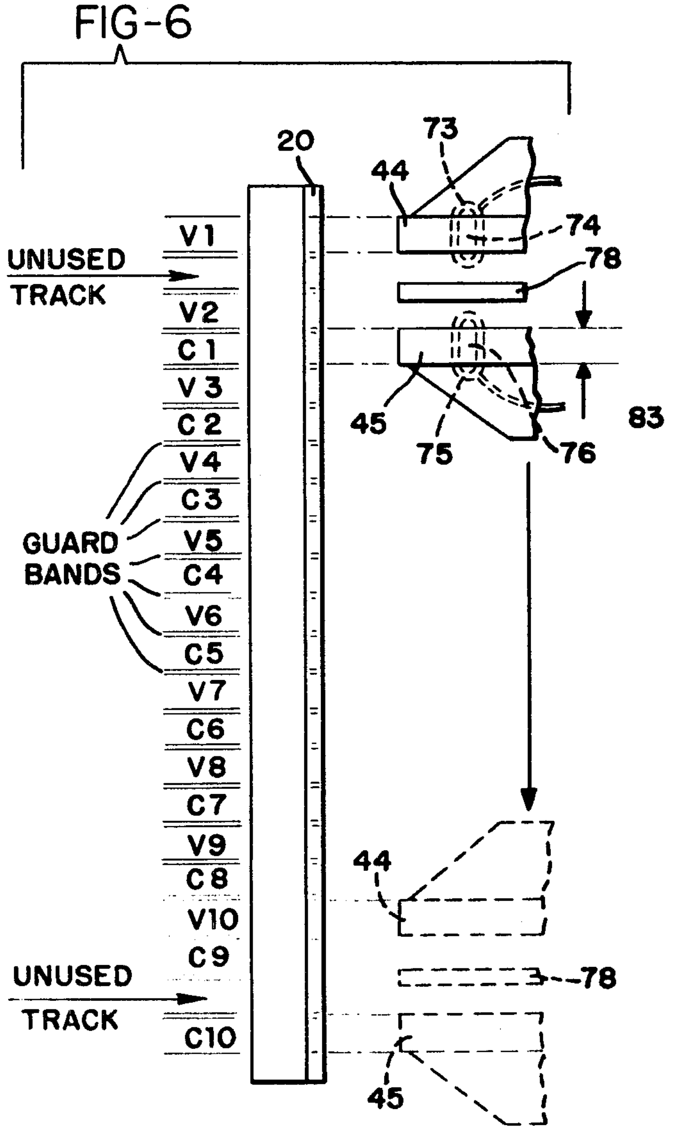
FIG. 6 is a diagram illustrating the manner in which successive adjacent tracks are utilized by the multiple transducers of the head on the tape.

Referring to FIGS. 5 and 6, the recording/playback head incorporates multiple transducers, in the case shown an upper and lower transducer 44 and 45, respectively. The surrounding structure or chassis 70 preferably is formed from a block, or mating halves, supporting the upper core 71 and lower core 72. Each of these has a small and precisely formed vertical gap *71a* and *72a*, respectively. Preferably these gaps are formed simultaneously by the same machining operation, thereby assuring that they are precisely in line. Within the head structure the coil 73 for the transducer 71 is formed around a core 74 and suitably supported within the core 71 of the transducer. Details of this mounting arrangement and construction are conventional, and are not shown since they are not a part of the present invention.

Similarly, the lower transducer includes a coil 75 wound on a core 76 which is supported within the lower armature 72. As previously mentioned, in one application where the present invention is used the signals handled by the upper coil 73 are video signals, and the signals handled by the lower coil 75 are color and audio signals. A magnetic shield 78 is mounted between the heads to prevent crosstalk between them, since the heads will normally be operating simultaneously on different tracks, and with different types of information. Generally speaking, in the illustrated example the type of information handled by the upper transducer is more susceptible to crosstalk problems with respect to adjacent tracks of the same type of information than is the different type of information handled through the lower transducer.

In one typical head used in an embodiment of the invention, the actual spacing between the upper edge of the face of the upper transducer and the lower edge of the face of the lower transducer is in the order of 0.077 inch. This dimension is indicated by the arrow 80 in FIG. 5. The spacing between the adjacent edges of the faces of the transducers is in the order of 0.043 inch, indicated by the arrow 81, the actual width of the shield 78 is in the order of 0.010 inch, and the vertical width of each of the two faces of the transducers is 0.017 inch, indicated by the arrow 83 in FIG. 6.

For purposes of explanation, in FIG. 6 the width of a typical piece of recording tape has been greatly increased beyond its actual size, the tape being indicated by its reference numeral 20. In the initial or uppermost position of the head, the upper transducer 44 follows the track V1, and the lower transducer 45 follows the track C1. These parallel track paths will exist preferably throughout the entire length of the tape as the transport moves the tape past the head. When the direction of tape movement is reversed, a signal from an appropriate one of the tape detectors 44 and 45 will actuate solenoid 62 to advance the cam 55 by one step.

The vertical distances between one step and the next, for example between step *55a* and step *55b*, equals the desired incremental movement of the head to a new position where the transducers will follow different parallel tracks. This incremental movement of the head is correlated to the spacing of the transducers 44 and 45 such that, bearing in mind that the two transducers operate with different types of information, no two adjacent tracks on the tape will contain the same type of information, yet all of the tracks will be equally spaced apart over essentially the entire range of movement of the head.

For purposes of example, successive in of the head can be indicated by appropriately designating the corresponding tracks. As seen in FIG. 6, in the second position transducer 44 follows track V2 and transducer 45 follows track C2. In moving to this new position the upper transducer moves across an unused track segment, which is so designated, and preferably also across small guard band segments which are provided between each of the adjacent tracks, having spacing in the order of 0.001 to 0.003 inch. For purposes of comparison, it may be seen from FIG. 6 that the total width of the active face of the head, from the upper edge of the face of transducer 44 to the lower edge of the face of transducer 45, is equivalent to four track widths plus guard band space. The movement of the head, thus resulting in joint movement of the transducers, is equivalent to two track widths plus the associated guard band space. Stated another way, the movement of the head equals two thirds the spacing between centers of the heads, when the transducer face or track widths are equal.

Therefore, as this type of movement progresses, eventually at the third position, track V3 is located between tracks C1 and C2, with appropriate guard band space between each of them. This progression continues as many times as desired to fill the full width of the tape, and in the last position there will be one additional unused track, i.e., the track so indicated between track C9 and C10.

In an actual embodiment of the invention, essentially as indicated, it has been possible to produce on the tape, and reproduce from it, 20 different tracts each of approximately the aforementioned width, leaving only the two unused tracks. Thus the invention permits maximum utilization of the recording surface on the tape, provides maximum possible shielding between tracks containing like types of information, and minimizes crosstalk between tracks to the point where it is not a factor of any concern. At the same time, the spacing between the individual transducers is sufficient to permit simplified and relatively easy construction of the transducers on the head, and to assure that the gaps are formed and maintained in proper alignment.

Figure 7:
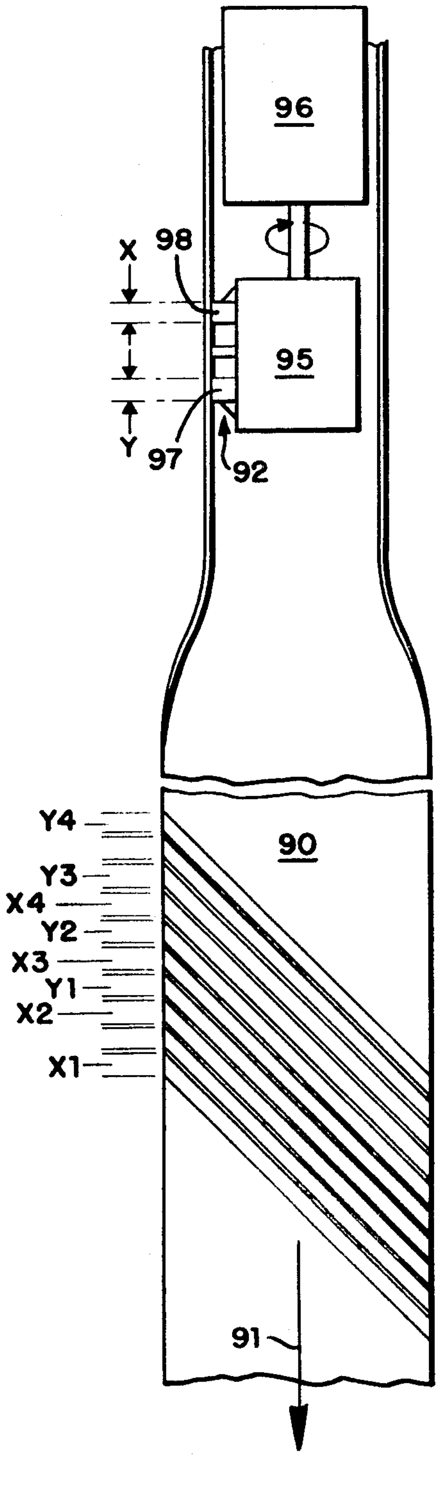
FIG. 7 is a diagram illustrating how the invention is applicable to helical scan recording.

FIG. 7 is a somewhat diagrammatic drawing showing how the invention can be applied to helical scan recording. The general arrangement of this type of recording system is well known, and is used for example in television recorders. The type 90 is moved in the direction of the arrow 91 by a suitable transport and drive (not shown) and the head 92 is mounted in a rotatable body member 95 which is continuously rotated by a motor 96 at a speed correlated to the advancing speed of the tape 90. This causes the head to scan in a helical manner across the tape. In order to distinguish from the track arrangement previously described, the transducers 97 and 98 of head 92 are shown as scanning track widths X and Y. By appropriate spacing of these transducers from each other, the resultant helical tracks on the tape are produced.

It will be noted that at the beginning track X1 is spaced a predetermined distance on the tape forward of the track from Y1, and on the next scan the track X2 lies adjacent to track Y1, and spaced somewhat from track X1, while track Y2 is similarly widely spaced from track Y1. On the third scan track X3 is located between track Y1 and Y2, and track Y3 is spaced by a full track width from track Y2. On the following scan track Y4 and X4 appear in like order.

It will also be appreciated by those skilled in the art that head 92 may be duplicated by like transducers, at one or more locations on the rotatable member 95. In this way, as is well known, there can be transducers corresponding to transducers 97 and 98 located, for example, 180° away from the head 92, on the opposite side of the member 95. The transducers in such case will be effective alternatively, since one or the other will actually be in operative relation to the tape which is curved about a portion of the periphery of the body 95, hence the actual tracks may be followed alternatively by one or the other of the corresponding transducers. In other words, tracks X1 and Y1 can be followed by one head and its pair of transducers, while tracks X2 and Y2 are followed by the other pair of transducers, and so on. Conventional slip rings (not shown) provide the circuit connections to the transducers.

It will be appreciated that in this manner it multichannel possible to locate the tracks on the tape such that all of the tracks X will carry only the one type of information, for example video information as previously explained, and all the Y tracks will transducers a different type of information, such as color and audio signals. Nevertheless, the adjacent tracks can be closely separated from each other, with a minimum of guard band between them, and the only unused track normally will be in the beginning and at the end, as for example the space between X1 and X2 and the corresponding space that will occur between the last and second from last Y tracks.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a magnetic recording system adapted for multichannel recording and/or playback,
   means for guiding and moving magnetic recording tape of a predetermined width lengthwise along a predetermined path,
   a head mounted adjacent said path,
   said head including at least two magnetic transducers having predetermined track widths spaced apart by a distance substantially less than the active surface of the tape for following spaced parallel tracks on the tape and independently operating with different types of information,
   means supporting said head for movement transversely of said path,
   control means operative on said supporting means to position said head in successive steps causing said transducers to follow different spaced parallel tracks longitudinally of the tape in each position of said head,
   the head movement provided for each step being an odd multiple of the spacing between said transducers and in excess of one track width whereby most of the tracks followed by one of said transducers always lie between tracks followed by the other of said transducers.

2. A magnetic recording system as defined in claim 1, wherein said control means includes detectors responsive to the movement of a length of tape fully to the opposite ends to said path,
   said detectors being operative on said tape guiding and moving means to reverse the direction of tape movement and to cause the control means to step the head to its next position for following different tracks.

3. In a magnetic recording system adapted for multichannel recording and/or playback of video and audio information,
   means for guiding and moving magnetic recording tape lengthwise along a predetermined path,
   a head mounted adjacent said path,
   said head including at least two magnetic transducers of predetermined gap width mounted in fixed spaced relation for following spaced parallel tracks on the tape and independently and concurrently operating one with video information and the other with audio information,
   means supporting said head for movement relative to the tape for alignment of said transducers with different tracks on the tape,
   control means operative on said supporting means to position said head successively through stepwise movements which are an odd multiple of the spacing between said transducers and in excess of one track width causing said transducers to follow different spaced parallel tracks on the tape in each position of the head, and
   the spacing between said transducers being correlated to the successive positions of said head provided by said control means such that with respect to any two adjacent tracks one contains video information and the other contains audio information.

4. A magnetic recording system as defined in claim 3, for multichannel recording and/or playback of color video and audio information, wherein color information is handled through said other magnetic transducer and is recorded on those tracks containing audio information.

5. In a magnetic recording system adapted for multichannel recording and/or playback,
   means for guiding and moving magnetic recording tape lengthwise along a predetermined path, a head mounted adjacent said path, said head including at least two magnetic transducers in fixed spaced relation for following spaced parallel tracks on the tape and independently operating with different types of information, the space between said transducers being equal to two track widths, means supporting said head for movement relative to the tape through increments equal to two track widths for alignment of said transducers with different tracks on the tape whereby the second track followed by one of said transducers is immediately adjacent the previous track followed by the other transducer and on the side of such previous track closest to the previous track followed by said one transducer and all of the resultant tracks are equally spaced apart over essentially the entire range of movement of said head.

6. A magnetic recording system as defined in claim 5, said transducers having gaps extending along a common line. 12

7. A magnetic recording system as defined in claim 5, wherein the means supporting said head includes a rotatable body carrying said head in cyclic fashion across the tape in correlated relation to the rate of movement of the tape along said path.

8. A magnetic recording system as defined in claim 5, wherein said supporting means holds said head with said transducers aligned to follow parallel tracks longitudinally of the tape, control means operative on said supporting means in successive equal steps causing said head to assume adjacent positions with said transducers following different tracks, and one of the tracks followed in any successive step lying intermediate the tracks followed in the immediately preceding step.

9. A magnetic recording system as defined in claim 8, wherein said control means includes a cam having a plurality of steps corresponding to the steps of movement required of said supporting means, a follower on said supporting means arranged to engage any one of said steps on said cam, and means for moving said cam to engage different ones of said steps with said follower.

10. A magnetic recording system as defined in claim 9, including detectors responsive to movement of a length of tape fully to opposite ends of said path, and connections from said detectors to said means for moving said cam and to said means for moving the tape to cause reversal of the tape movement and stepping of said head to its next position.